(12) United States Patent
Hedman et al.

(10) Patent No.: US 12,736,117 B2
(45) Date of Patent: Sep. 15, 2026

(54) TRANSMISSION ARRANGEMENT, POWERTRAIN, AND VEHICLE

(71) Applicant: Volvo Truck Corporation, Gothenburg (SE)

(72) Inventors: Anders Hedman, Marstrand (SE); Sven Norberg, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/229,109

(22) Filed: Jun. 5, 2025

(65) Prior Publication Data

US 2026/0009455 A1 Jan. 8, 2026

(30) Foreign Application Priority Data

Jul. 8, 2024 (EP) .................................... 24187155

(51) Int. Cl.
*F16H 37/08* (2006.01)

(52) U.S. Cl.
CPC ... *F16H 37/082* (2013.01); *F16H 2200/0021* (2013.01); *F16H 2200/0034* (2013.01); *F16H 2200/2007* (2013.01)

(58) Field of Classification Search
CPC ..... F16H 2200/2007; F16H 2200/0021; B60K 1/02
See application file for complete search history.

(56) References Cited

U.S. PATENT DOCUMENTS

| | | | | |
|---|---|---|---|---|
| 7,086,977 | B2 * | 8/2006 | Supina | B60L 15/20 475/5 |
| 2019/0078672 | A1 * | 3/2019 | Duan | F16D 65/18 |
| 2021/0347253 | A1 | 11/2021 | Seemann et al. | |
| 2022/0082166 | A1 | 3/2022 | Vincon et al. | |
| 2025/0043850 | A1 * | 2/2025 | Mock | F16H 57/10 |
| 2025/0102049 | A1 * | 3/2025 | Engerman | B60K 6/365 |

FOREIGN PATENT DOCUMENTS

| | | | | |
|---|---|---|---|---|
| CN | 217477088 | U | 9/2022 | |
| DE | 102021004159 | B3 * | 11/2022 | B60K 17/02 |
| DE | 102022204851 | A1 | 11/2023 | |
| DE | 102022213187 | A1 | 6/2024 | |
| JP | 2007050877 | A * | 3/2007 | B60K 6/00 |
| JP | 2020097952 | A | 6/2020 | |
| WO | 2020037233 | A1 | 2/2020 | |
| WO | 2022023302 | A1 | 2/2022 | |
| WO | 2022023303 | A1 | 2/2022 | |

OTHER PUBLICATIONS

Extended European Search Report for European Patent Application No. 24187155.7, mailed Dec. 13, 2024, 14 pages.

* cited by examiner

*Primary Examiner* — Stacey A Fluhart
(74) *Attorney, Agent, or Firm* — Withrow & Terranova, PLLC

(57) ABSTRACT

A transmission arrangement for a vehicle, comprising a first planetary gearset, a first secondary reduction gearset, a second planetary gearset, and at least one drive shaft. The disclosure also relates to a powertrain and a vehicle.

21 Claims, 7 Drawing Sheets

TRANSMISSION ARRANGEMENT, POWERTRAIN, AND VEHICLE

PRIORITY APPLICATIONS

The present application claims priority to European Patent Application No. 24187155.7, filed on Jul. 8, 2024, and entitled "TRANSMISSION ARRANGEMENT, POWERTRAIN, AND VEHICLE," which is incorporated herein by reference in its entirety.

TECHNICAL FIELD

The disclosure relates generally to transmissions for vehicles. In particular aspects, the disclosure relates to a transmission arrangement for a vehicle, a powertrain for a vehicle and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A transmission for a vehicle is generally adapted for transferring power at different speed ratios from an internal combustion engine to drive wheels. However, due to the electrification trend, there is also a need to develop transmissions for transferring power between an electric motor/generator and drive wheels. To this end, shiftable transmissions may not always be required for electric vehicles, such as for electric passenger cars. However, for larger and heavier electric vehicles, such as trucks, buses and construction equipment, it may be beneficial to use a shiftable transmission.

In view of the above, there is a strive to develop improved technology relating to shiftable transmissions for vehicles, in particular electric vehicles.

SUMMARY

According to a first aspect of the disclosure, a transmission arrangement for a vehicle is provided. The transmission arrangement comprises:

a first planetary gearset, configured to be drivingly connected to a first power unit upstream from the first planetary gearset, and shiftable between at least two gear states, comprising a direct gear state with a 1:1 speed ratio and a speed reduction gear state, a first secondary reduction gearset drivingly connected to the first planetary gearset and provided downstream the first planetary gearset, a second planetary gearset drivingly connected to the first secondary reduction gearset and provided downstream the first secondary reduction gearset, wherein the second planetary gearset is shiftable between at least two gear states, comprising a direct gear state with a 1:1 speed ratio and at least one speed reduction gear state, at least one drive shaft, preferably two half-shafts, drivingly connected to the second planetary gearset and provided downstream the second planetary gearset, wherein the at least one drive shaft and the second planetary gearset are coaxially arranged and configured to rotate with respect to a common rotational axis. The first aspect of the disclosure may seek to provide an improved transmission arrangement for a vehicle, in particular an electric vehicle, which is compact and provides favorable speed ratios from the first power unit to the at least one drive shaft. A technical benefit may include that a compact transmission arrangement is provided which can be shifted between at least four different "gears" or speed ratios. This may result in improved efficiency of the vehicle, i.e., a more favorable speed ratio may be selected for a specific driving situation. For example, by use of the first planetary gearset as disclosed herein, a speed reduction ratio of the first secondary reduction gearset may be reduced, in contrast to if the transmission arrangement did not comprise the first planetary gearset as disclosed herein. The reduced speed reduction ratio implies that at least one smaller gearwheel may be used in the first secondary reduction gearset, i.e., resulting in a more compact configuration.

A reduction gearset as disclosed herein means a gearset which is adapted to provide a speed reduction, i.e., as seen from an input side to an output side of the reduction gearset.

Optionally in some examples, including in at least one preferred example, the speed reduction of the first planetary gearset when being in the speed reduction gear state is smaller than the speed reduction of the second planetary gearset when being in at least one speed reduction gear state of the at least one speed reduction gear state. A technical benefit may include that the first planetary gearset may be dimensioned for smaller torque values as compared to the second planetary gearset which is provided downstream the first planetary gearset. This may result in a more compact first planetary gearset. For example, it has been realized that it is favorable to configure the transmission arrangement with larger speed ratios further down the transmission arrangement, as seen along a torque path from the first power unit to the at least one drive shaft. Thereby, components provided upstream of the larger speed ratios may be dimensioned for smaller torque values, e.g., resulting in a more compact configuration.

Optionally in some examples, including in at least one preferred example, the transmission arrangement further comprises a first additional reduction gearset, drivingly connected to the first planetary gearset and provided upstream the first planetary gearset, and wherein the first additional reduction gearset is configured to be drivingly connected to the first power unit upstream from the first additional reduction gearset. A technical benefit may include that this enables a further decrease of the speed reduction ratio of the first secondary reduction gearset. This in turn may result in a more compact first secondary reduction gearset, i.e. a smaller gearwheel may be used. Additionally, or alternatively, a technical benefit may include that a smaller first power unit may be used and/or a higher-speed first power unit may be used.

Optionally in some examples, including in at least one preferred example, a rotational axis of the first planetary gearset is parallel to the common rotational axis. A technical benefit may include that a more compact transmission arrangement is provided.

Optionally in some examples, including in at least one preferred example, the transmission arrangement further comprises a differential gearset drivingly connected to the at least one drive shaft and to the second planetary gearset, and provided downstream the second planetary gearset and upstream from the at least one drive shaft, wherein the at least one drive shaft, the second planetary gearset and the differential gearset are coaxially arranged and configured to rotate with respect to the common rotational axis. A technical benefit may include that a compact transmission arrangement including a differential gearset is provided.

Optionally in some examples, including in at least one preferred example, at least one of the first planetary gearset and the second planetary gearset is configured to be shiftable to a neutral state. A technical benefit of the first planetary gearset being configured to be shiftable to a neutral state may include that power transmission from the first power unit to the at least one drive shaft is disabled. A technical benefit of the second planetary gearset being configured to be shiftable to a neutral state may include that power transmission from the second planetary gearset to the at least one drive shaft is disabled. This may e.g. result in reduced energy losses during downhill travel.

Optionally in some examples, including in at least one preferred example, the transmission arrangement further comprises a second secondary reduction gearset drivingly connected to the second planetary gearset and provided upstream from the second planetary gearset, and configured to be drivingly connected to a second power unit upstream from the second secondary reduction gearset. A technical benefit may include that a second power unit may be used for transferring power. This may result in higher achievable power output to the at least one drive shaft. Additionally, or alternatively, this may enable the use of smaller power units, i.e., resulting in a more compact configuration.

Optionally in some examples, including in at least one preferred example, the transmission arrangement further comprises a clutch arrangement for selectively disconnecting a driving connection between the second power unit and the second secondary reduction gearset. A technical benefit may include that, on some occasions, only the first power unit may be used for driving the vehicle. This may result in energy savings, e.g., during points of operation with low power.

Optionally in some examples, including in at least one preferred example, the transmission arrangement further comprises a second additional reduction gearset, drivingly connected to the second secondary reduction gearset and provided upstream the second secondary reduction gearset, and wherein the second additional reduction gearset is configured to be drivingly connected to the second power unit upstream from the second additional reduction gearset. A technical benefit may include that this enables a decrease of the speed reduction ratio of the second secondary reduction gearset. This in turn may result in a more compact second secondary reduction gearset, i.e. a smaller gearwheel may be used. Additionally, or alternatively, a technical benefit may include that a smaller second power unit may be used and/or a higher-speed second power unit may be used.

Optionally in some examples, including in at least one preferred example, the first secondary reduction gearset and the second secondary reduction gearset share a common gearwheel and are provided in a common gear plane. A technical benefit may include that fewer components are required. Additionally, or alternatively, a technical benefit may include that a more compact transmission arrangement is achieved. The common gear plane is preferably perpendicular to the common rotational axis.

Optionally in some examples, including in at least one preferred example, the first secondary reduction gearset comprises a first gearwheel drivingly connected to the common gearwheel and the second secondary reduction gearset comprises a second gearwheel drivingly connected to the common gearwheel, wherein a number of gear teeth of the first gearwheel is different from a number of gear teeth of the second gearwheel. A technical benefit may include that different speed ratios are provided by the first and second secondary reduction gearsets. This may result in more favorable speed ratios from the first and second power units, e.g., resulting in improved driving efficiency. By way of example, the first gearwheel may have more gear teeth than the second gearwheel.

Optionally in some examples, including in at least one preferred example, the transmission arrangement further comprises a third planetary gearset, configured to be drivingly connected to the second power unit upstream from the third planetary gearset, and shiftable between at least two gear states, comprising a direct gear state with a 1:1 speed ratio and a speed reduction gear state. A technical benefit may include that, by use of the third planetary gearset as disclosed herein, a speed reduction ratio of the second secondary reduction gearset may be reduced, in contrast to if the transmission arrangement did not comprise the third planetary gearset as disclosed herein. The reduced speed reduction ratio implies that at least one smaller gearwheel may be used in the second secondary reduction gearset, i.e., resulting in a more compact configuration.

Optionally in some examples, including in at least one preferred example, the speed reduction of the third planetary gearset when being in the speed reduction gear state is smaller than the speed reduction of the second planetary gearset when being in at least one speed reduction gear state of the at least one speed reduction gear state. A technical benefit may include that the third planetary gearset may be dimensioned for smaller torque values as compared to the second planetary gearset which is provided downstream the third planetary gearset. This may result in a more compact third planetary gearset. For example, it has been realized that it is favorable to configure the transmission arrangement with larger speed ratios further down the transmission arrangement, as seen along a torque path from the second power unit to the at least one drive shaft. Thereby, components provided upstream of the larger speed ratios may be dimensioned for smaller torque values, e.g., resulting in a more compact configuration.

Optionally in some examples, the second additional reduction gearset as mentioned in the above is provided upstream from the third planetary gearset. A technical benefit may include that this enables a decrease of the speed reduction ratio of the second secondary reduction gearset and/or of the third planetary gearset. This in turn may result in a more compact second secondary reduction gearset and/or third planetary gearset. Additionally, or alternatively, a technical benefit may include that a smaller second power unit may be used and/or a higher-speed second power unit may be used.

Optionally in some examples, including in at least one preferred example, the third planetary gearset is configured to be shiftable to a neutral state. A technical benefit of the third planetary gearset being configured to be shiftable to a neutral state may include that power transmission from the second power unit to the at least one drive shaft is disabled. This may result in energy savings, e.g., by enabling single motor operation during points of operation with low power.

Optionally in some examples, including in at least one preferred example, a rotational axis of the third planetary gearset is parallel to the common rotational axis. A technical benefit may include that a more compact transmission arrangement is provided.

Optionally in some examples, including in at least one preferred example, the transmission arrangement is configured with a constant non-shiftable speed reduction from the second power unit to the second planetary gearset. A technical benefit may include that a compact and cost-effective transmission arrangement is achieved.

The terms downstream and upstream as used herein relate to a direction of a torque path from a respective connection interface of the first/second power unit(s) to the at least one drive shaft. Accordingly, downstream means that something is provided further down in the aforementioned direction and upstream means that something is provided further up in the aforementioned direction.

According to a second aspect of the disclosure, a powertrain for a vehicle is provided. The powertrain comprises a first power unit and a transmission arrangement according to any one of the examples of the first aspect of the disclosure, or comprising a first power unit, a second power unit and a transmission arrangement according to any one of the examples of the first aspect of the disclosure comprising the second power unit. Advantages and technical benefits of the second aspect of the disclosure are analogous to the advantages and effects of the first aspect of the disclosure. The first power unit is preferably an electric motor/generator and/or the second power unit is preferably an electric motor/generator.

According to a third aspect of the disclosure, a vehicle is provided. The vehicle comprises a transmission arrangement according to any one of the examples of the first aspect of the disclosure or a powertrain according to any one of the examples of the second aspect of the disclosure. Advantages and technical benefits of the third aspect of the disclosure are analogous to the advantages and effects of the first and second aspects of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

Figure 1:
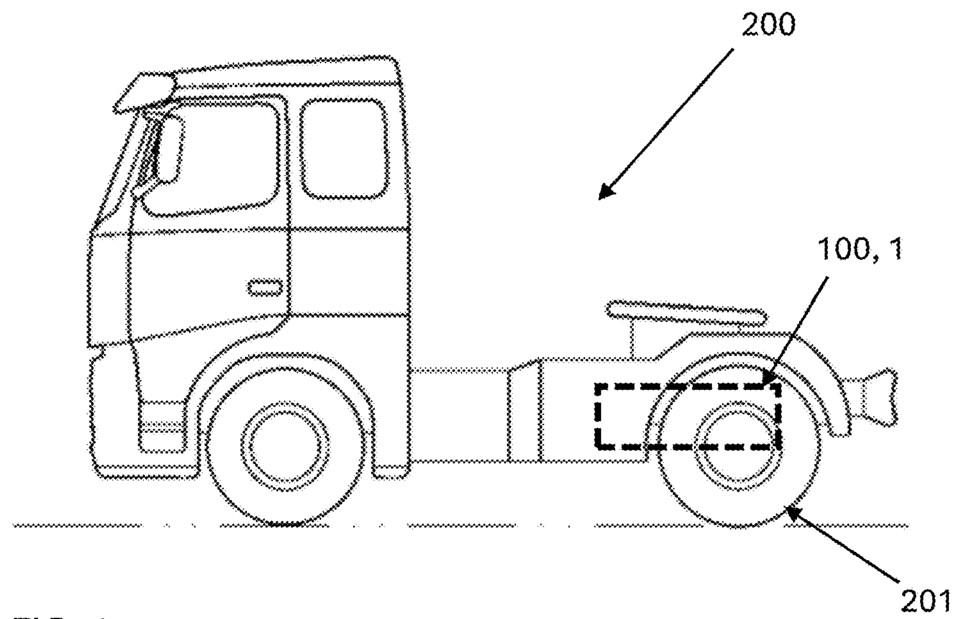
FIG. 1 is an exemplary vehicle in a side view according to an example.

The drawings are not necessarily drawn to scale. It shall also be noted that some details in the drawings may be exaggerated in order to better describe and illustrate the particular example. Like reference characters refer to like elements throughout the description, unless expressed otherwise. Some reference characters may have been omitted in some of the drawings for clarity.

DETAILED DESCRIPTION

The detailed description set forth below provides information and examples of the disclosed technology with sufficient detail to enable those skilled in the art to practice the disclosure.

An aim of the present disclosure is to provide an improved transmission arrangement for a vehicle which at least partly alleviates one or more drawbacks of the prior art, or which at least provides a suitable alternative. Other aims of the present disclosure are to provide an improved powertrain and a vehicle, which at least partly alleviate one or more drawbacks of the prior art, or which at least provide suitable alternatives. The transmission arrangement as disclosed herein may seek to provide a compact, cost-effective and efficient transmission arrangement for a vehicle. The configuration of the transmission arrangement as disclosed herein has shown to be advantageous for vehicle powertrains, such as for fully or at least partially electric powertrains. By way of example, by the present disclosure, a compact transmission arrangement may be provided which can be shifted between at least four different "gears" or speed ratios. This may result in improved driving efficiency of the vehicle, i.e., a more favorable speed ratio may be selected for a specific driving situation.

FIG. 1 is an exemplary vehicle 200 in a side view according to an example. The vehicle 200 is herein a heavy-duty truck, and more particularly a towing truck for towing one or more trailers (not shown). It shall however be noted that the present disclosure is applicable to any other vehicle, such as any other truck, a bus, a passenger car, construction equipment, such as a wheel loader, an excavator, a dump truck etc.

The vehicle 200 may as shown comprise a transmission arrangement 1 and/or a powertrain 100 according to examples of the present disclosure. The powertrain 100 comprises a power unit (not shown) which is drivingly connected to drive wheels 201 via the transmission arrangement 1. More detailed examples of the transmission arrangement 1 and the powertrain 100 will be described in the below. The drive wheels 201 are in this example rear wheels of the vehicle 200. It shall however be noted that drive wheels may be provided at any other location, such as at the front of the vehicle. In other examples, drive wheels may be used for driving crawler members of the vehicle, e.g., of an excavator.

Figure 2:
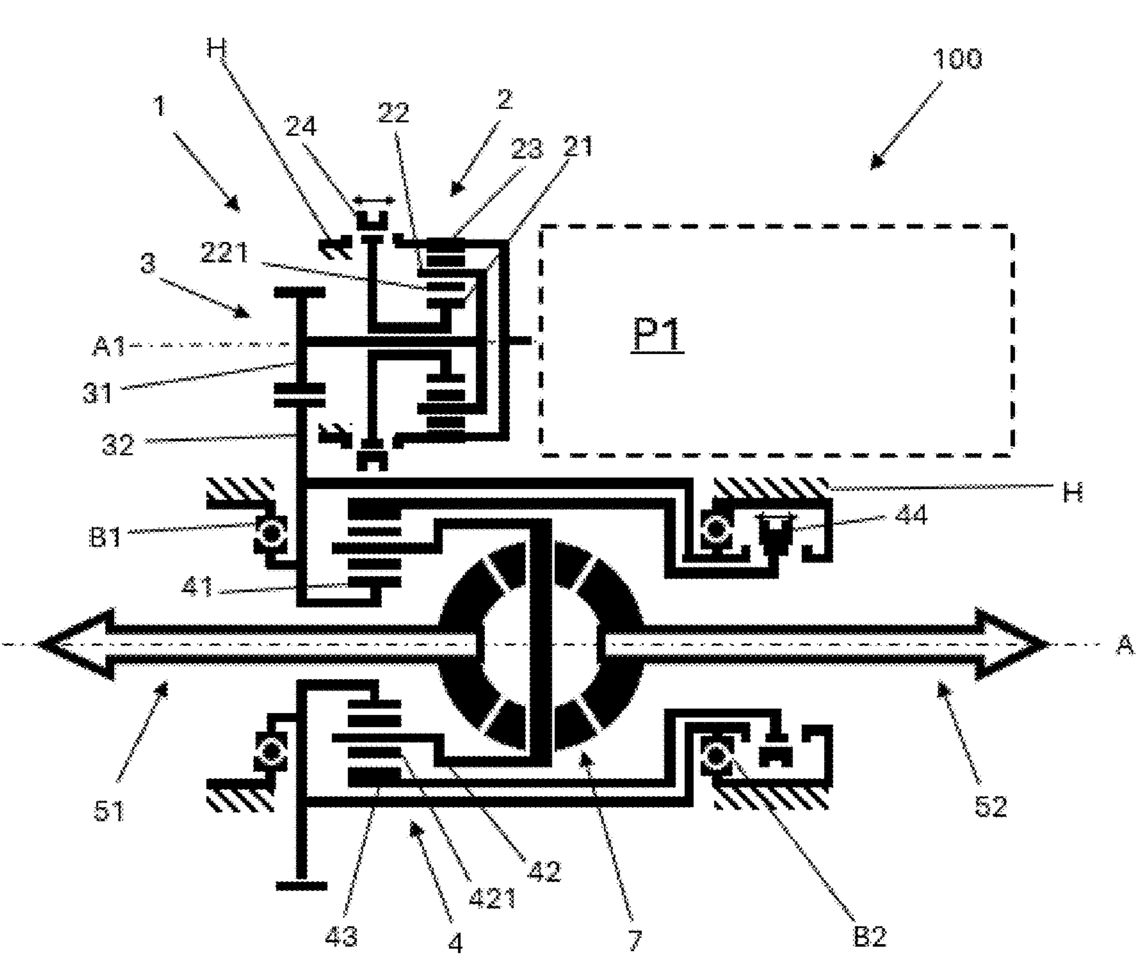
FIG. 2 is an exemplary transmission arrangement and/or powertrain in a schematic view according to an example.

FIG. 2 depicts an exemplary transmission arrangement 1 in a schematic view according to an example, which for example may form part of the vehicle 200 shown in FIG. 1.

The transmission arrangement 1 comprises a first planetary gearset 2, configured to be drivingly connected to a first power unit P1 upstream from the first planetary gearset 2, and shiftable between at least two gear states, comprising a direct gear state with a 1:1 speed ratio and a speed reduction gear state. The power unit P1 is herein indicated by a box with dashed lines. Accordingly, FIG. 2 also depicts a powertrain 100 according to an example disclosed herein, wherein the first power unit P1 is drivingly connected to the first planetary gearset 2.

In the shown example, the first planetary gearset 2 comprises a sun gearwheel 21, a planet carrier 22 carrying a plurality of planet gearwheels 221, and a ring gearwheel 23.

The first planetary gearset 2 is shiftable by use of a first gear engaging member 24. As shown, the first gear engaging member 24 may be a sleeve formed member. The first gear engaging member 24 is in this example configured to rotationally lock the sun gearwheel 21 to the ring gearwheel 23 in the direct gear state, and to rotationally lock the sun gearwheel 21 to a fixed member H in the speed reduction gear state. The fixed member H is in this example a transmission housing. It shall be noted that the direct gear state may be provided by locking any two members of the first planetary gearset, and the speed reduction gear state may be provided by locking another member of the first planetary gearset to the fixed member H.

The transmission arrangement 1 further comprises a first secondary reduction gearset 3 drivingly connected to the first planetary gearset 2 and provided downstream the first planetary gearset 2. In the shown example, the first secondary reduction gearset 3 is configured by a first gearwheel 31 and a second secondary reduction gearset gearwheel 32 which are in meshing engagement. Accordingly, in some examples, first secondary reduction gearset 3 is provided by two gearwheels in meshing engagement with each other.

The transmission arrangement 1 further comprises a second planetary gearset 4 drivingly connected to the first secondary reduction gearset 3 and provided downstream the first secondary reduction gearset 3, wherein the second planetary gearset 4 is shiftable between at least two gear states, comprising a direct gear state with a 1:1 speed ratio and at least one speed reduction gear state.

In the shown example, the second planetary gearset 4 comprises a sun gearwheel 41, a planet carrier 42 carrying a plurality of planet gearwheels 421, and a ring gearwheel 43.

The second secondary reduction gearset gearwheel 32 is in this example rotationally fixed to the sun gearwheel 41.

The second planetary gearset 4 is shiftable by use of a second gear engaging member 44. As shown, the second gear engaging member 44 may be a sleeve formed member. The second gear engaging member 44 is in this example configured to rotationally lock the ring gearwheel 43 to the secondary reduction gearset gearwheel 32 in the direct gear state, and to rotationally lock the ring gearwheel 43 to the fixed member H in the speed reduction gear state. It shall be noted that the direct gear state may be provided by locking any two members of the second planetary gearset, and the speed reduction gear state may be provided by locking another member of the second planetary gearset to the fixed member H. Additionally, or alternatively, the second secondary reduction gearset gearwheel 32 may be fixed to another member of the second planetary gearset 4, instead of to the sun gearwheel 41.

In the shown example, the second planetary gearset 4 is shiftable by use of one gear engaging member 44. It shall however be noted that more gear states may be provided by use of an additional gear engaging member (not shown) which e.g. is configured selectively rotationally lock and release the second secondary reduction gearset gearwheel 32 to/from the sun gearwheel 41.

The transmission arrangement 1 further comprises at least one drive shaft 51, 52, preferably two half-shafts 51, 52, drivingly connected to the second planetary gearset 4 and provided downstream the second planetary gearset 4. The at least one drive shaft 51, 52 and the second planetary gearset 4 are coaxially arranged and configured to rotate with respect to a common rotational axis A. The common rotational axis A is typically provided along a transverse direction of the vehicle 200 when the transmission arrangement 1 is provided in the vehicle 200.

As shown, the transmission arrangement 1 may further comprise a differential gearset 7 drivingly connected to the at least one drive shaft 51, 52 and to the second planetary gearset 4, and provided downstream the second planetary gearset 4 and upstream from the at least one drive shaft 51, 52, wherein the at least one drive shaft 51, 52, the second planetary gearset 4 and the differential gearset 7 are coaxially arranged and configured to rotate with respect to the common rotational axis A.

As further shown, the second planetary gearset 4, the second secondary reduction gearset gearwheel 32, and the differential gearset 7, may be suspended by bearings B1, B2 provided on opposite sides of the differential gearset 7 and/or of the second planetary gearset 4, as seen along the common rotational axis A. A technical benefit may include that high bending stiffness is achieved, while also achieving a compact transmission configuration. The bearings B1, B2 may be any type of sliding or rolling bearing, such as a ball bearing and/or a roller bearing.

By way of example, the speed reduction of the first planetary gearset 2 when being in the speed reduction gear state may be smaller than the speed reduction of the second planetary gearset 4 when being in at least one speed reduction gear state of the at least one speed reduction gear state. In the shown example, and as intimated in the above, the second planetary gearset 4 comprises only one speed reduction gear state.

By the configuration as shown in FIG. 2, four different (i.e., 2×2) speed ratios from the first power unit P1 to the at least one drive shaft 51, 52 are achievable, by shifting the first and second gear engaging members 24, 44.

Preferably, as shown, a rotational axis A1 of the first planetary gearset 2 is parallel to the common rotational axis A. Accordingly, as further shown, a rotational axis A1 of the first power unit P1 is preferably parallel to the common rotational axis A.

At least one of the first planetary gearset 2 and the second planetary gearset 4 may be configured to be shiftable to a neutral state. For example, this may be achieved by providing the first or second gear engaging member 24, 44 in a position between the direct gear state and the speed reduction gear state.

Figure 3:
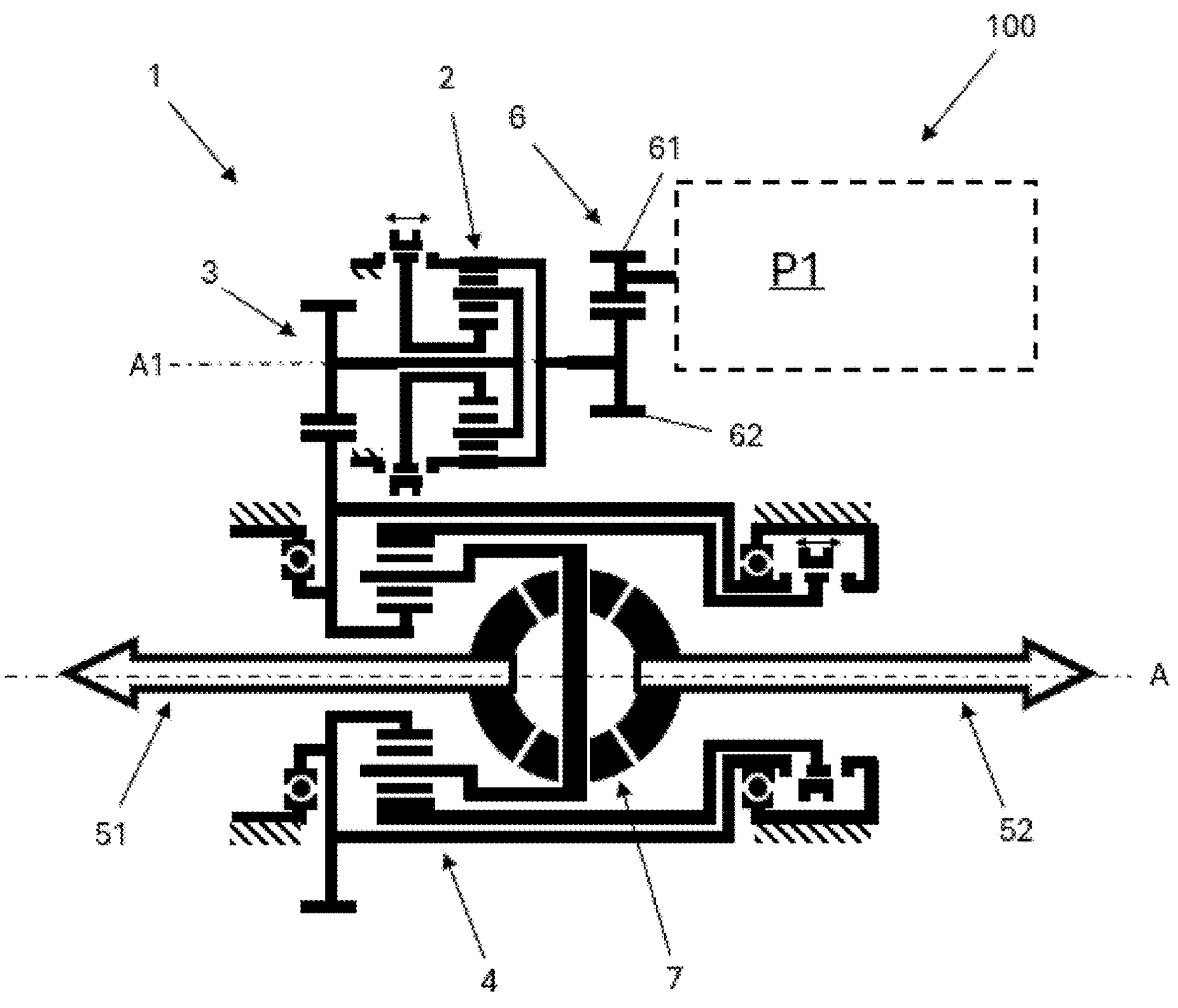
FIG. 3 is an exemplary transmission arrangement and/or powertrain in a schematic view according to an example.

FIG. 3 depicts an exemplary transmission arrangement 1 in a schematic view according to another example, which for example may form part of the vehicle 200 shown in FIG. 1.

In this example, the transmission arrangement 1 is similar to the transmission arrangement 1 shown in FIG. 2, with the difference that it further comprises a first additional reduction gearset 6, drivingly connected to the first planetary gearset 2 and provided upstream the first planetary gearset 2. The first additional reduction gearset 6 is configured to be drivingly connected to the first power unit P1 upstream from the first additional reduction gearset 6. In this example, the first additional reduction gearset 6 comprises a first additional reduction gearset first gearwheel 61 which is in meshing engagement with a first additional reduction gearset second gearwheel 62. The first additional reduction gearset second gearwheel 62 is in this example also aligned with the rotational axis A1. Further, in this example, the rotational axis of the first power unit P1 is parallel to the common rotational axis A and to the rotational axis A1.

Figure 4:
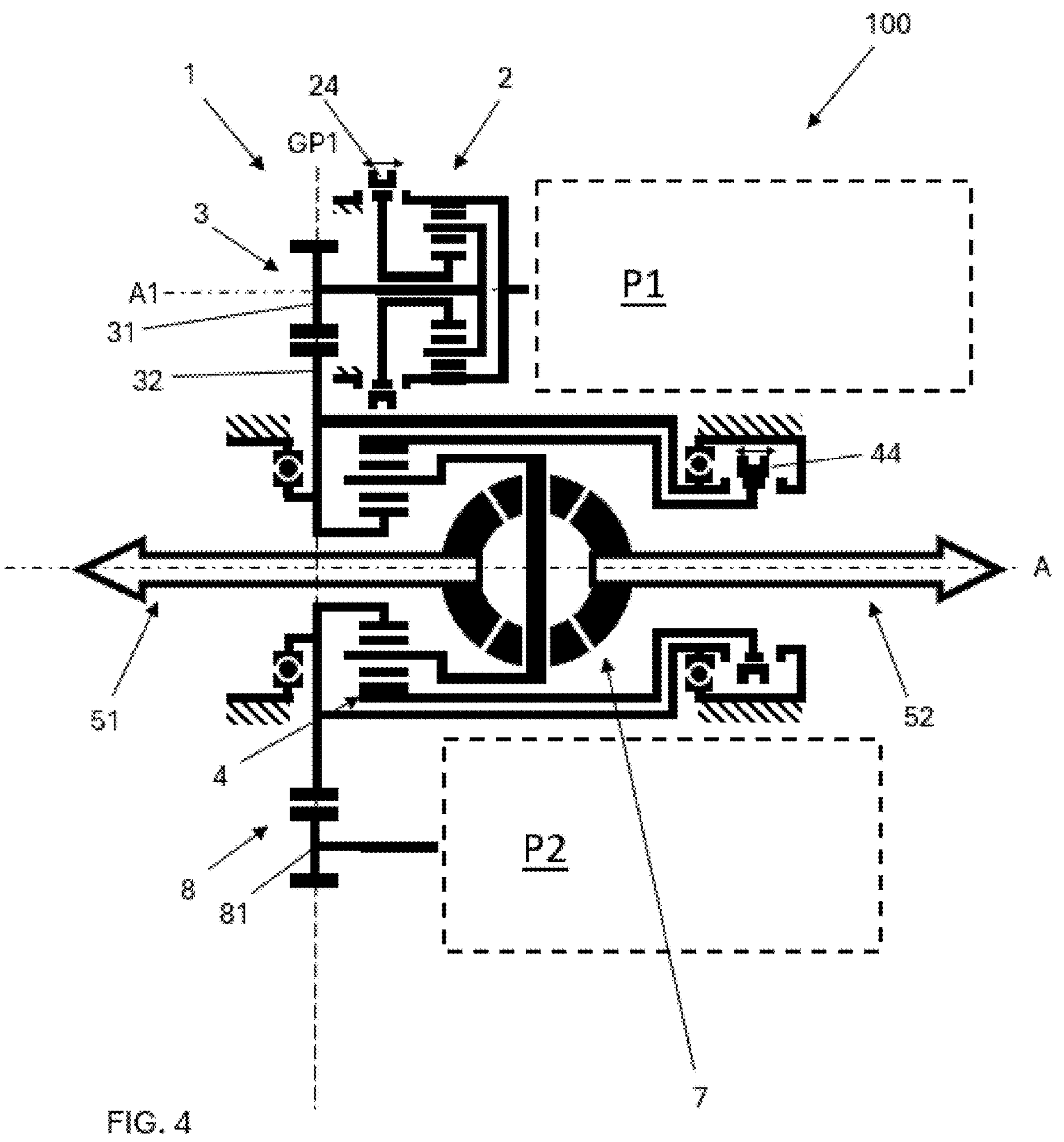
FIG. 4 is an exemplary transmission arrangement and/or powertrain in a schematic view according to an example.

FIG. 4 depicts an exemplary transmission arrangement 1 in a schematic view according to another example, which for example may form part of the vehicle 200 shown in FIG. 1.

In this example, the transmission arrangement 1 is similar to the transmission arrangement 1 shown in FIG. 2, with the difference that it further comprises a second secondary reduction gearset 8 drivingly connected to the second planetary gearset 4 and provided upstream from the second planetary gearset 4, and configured to be drivingly connected to a second power unit P2 (indicated by a box with dashed lines) upstream from the second secondary reduction gearset 8. Accordingly, FIG. 4 also depicts a powertrain 100 in which the second power unit P2 is drivingly connected to the second secondary reduction gearset 8.

As shown, the first secondary reduction gearset 3 and the second secondary reduction gearset 8 preferably share a common gearwheel 32, i.e. the above mentioned second secondary reduction gearset gearwheel 32, and are provided in a common gear plane GP1. The common gear plane is in this example perpendicular to the common rotational axis A.

The second secondary reduction gearset 8 comprises in this example a second gearwheel 81 which is in meshing engagement with the common gearwheel 32.

By way of example, a number of gear teeth of the first gearwheel 31 may be different from a number of gear teeth of the second gearwheel 81. In some examples, the first gearwheel 31 has more gear teeth than the second gearwheel 81.

In some preferred examples, as e.g. depicted in FIG. 4, the transmission arrangement 1 is configured with a constant non-shiftable speed reduction from the second power unit 2 to the second planetary gearset 4.

Further, as shown, the rotational axis of the second power unit P2 is preferably parallel to the common rotational axis A.

By the configuration as shown in FIG. 4, six different gear states are achievable, e.g. by shifting the first gear engaging member 24 between its two engaged states and the neutral state, and by shifting the second gear engaging member 44 between its two engaged states. A power cut will occur when shifting the second gear engaging member 44.

Figure 5:
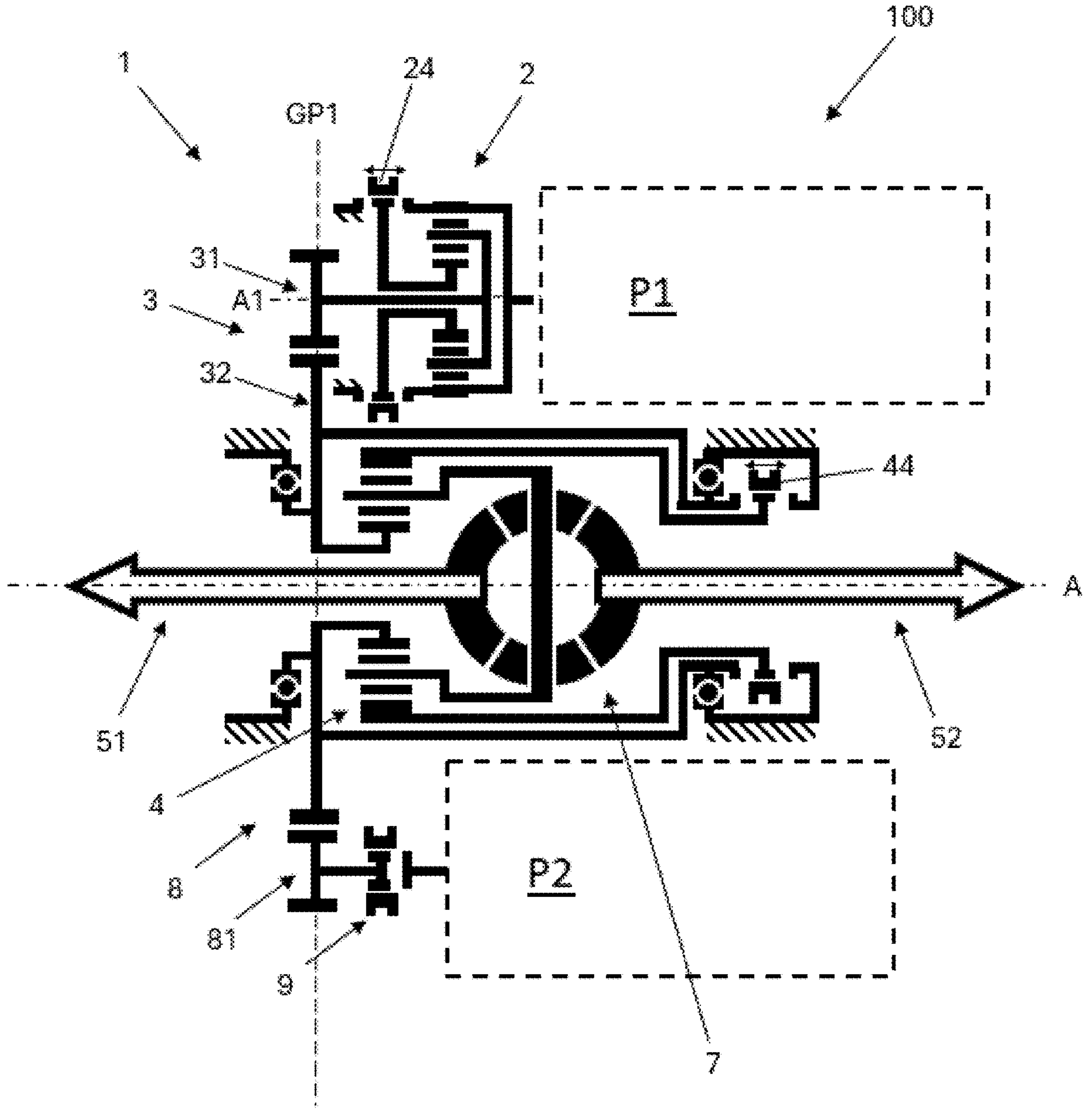
FIG. 5 is an exemplary transmission arrangement and/or powertrain in a schematic view according to an example.

FIG. 5 depicts an exemplary transmission arrangement 1 in a schematic view according to another example, which for example may form part of the vehicle 200 shown in FIG. 1.

In this example, the transmission arrangement 1 is similar to the transmission arrangement 1 shown in FIG. 4, with the difference that it further comprises a clutch arrangement 9 for selectively disconnecting a driving connection between the second power unit P2 and the second secondary reduction gearset 8.

By this configuration, further gear states are possible. More specifically, by selectively drivingly connecting and disconnecting the second power unit P2, and by shifting the first/second gear engaging members 24, 44, up to ten different gear states when power is transmitted from the first and/or second power unit P1, P2 are possible.

Figure 6:
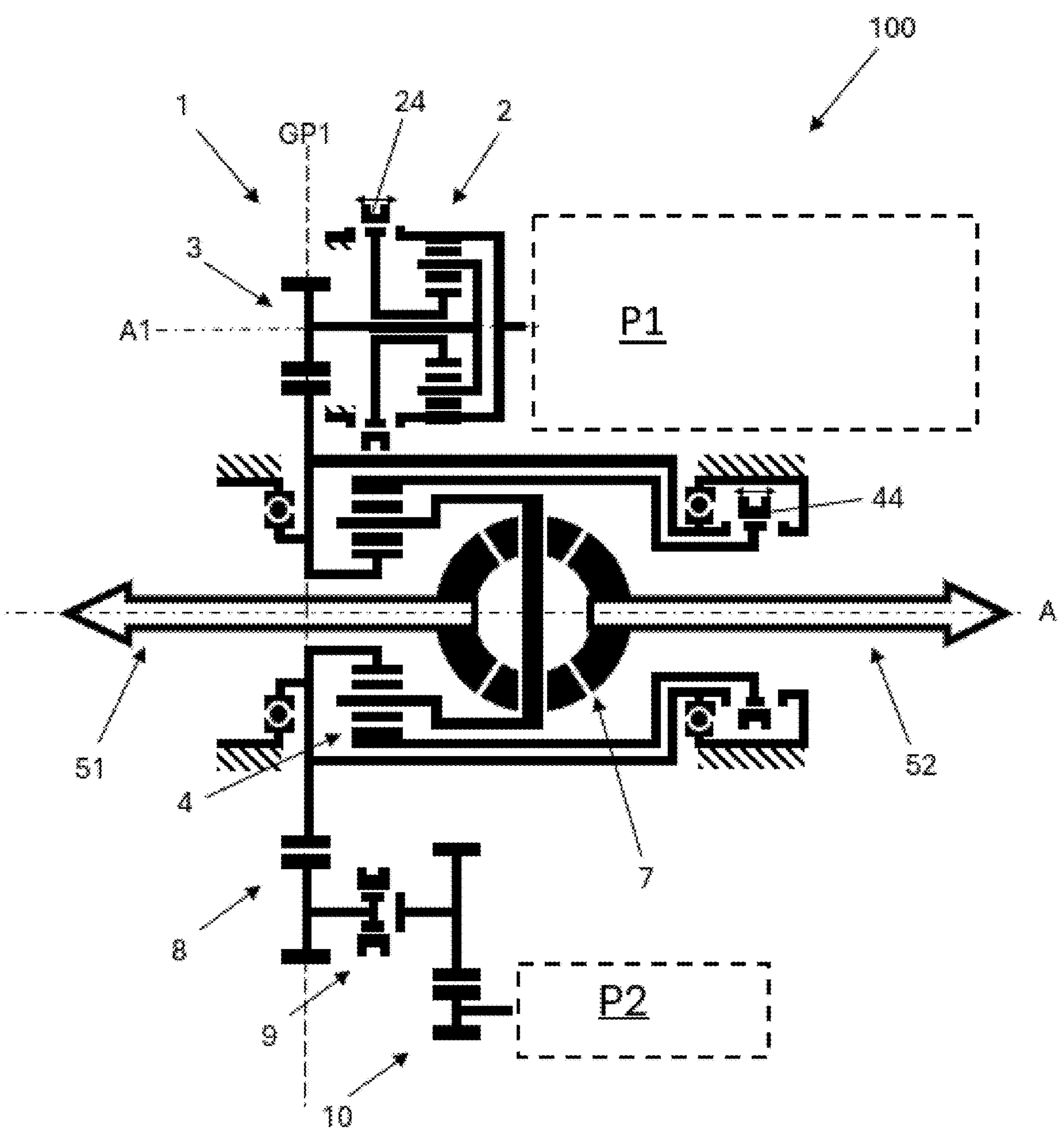
FIG. 6 is an exemplary transmission arrangement and/or powertrain in a schematic view according to an example.

FIG. 6 depicts an exemplary transmission arrangement 1 in a schematic view according to another example, which for example may form part of the vehicle 200 shown in FIG. 1.

In this example, the transmission arrangement 1 is similar to the transmission arrangement 1 shown in FIG. 5, with the difference that it further comprises a second additional reduction gearset 10, drivingly connected to the second secondary reduction gearset 8 and provided upstream the second secondary reduction gearset 8, and wherein the second additional reduction gearset 10 is configured to be drivingly connected to the second power unit P2 upstream from the second additional reduction gearset 10. As indicated in FIG. 6, this configuration may result in that a smaller second power unit P2 may be used, and/or a higher-speed second power unit P2.

In this example, the clutch arrangement 9 is provided downstream the second additional reduction gearset 10 and upstream the second secondary reduction gearset 8.

Figure 7:
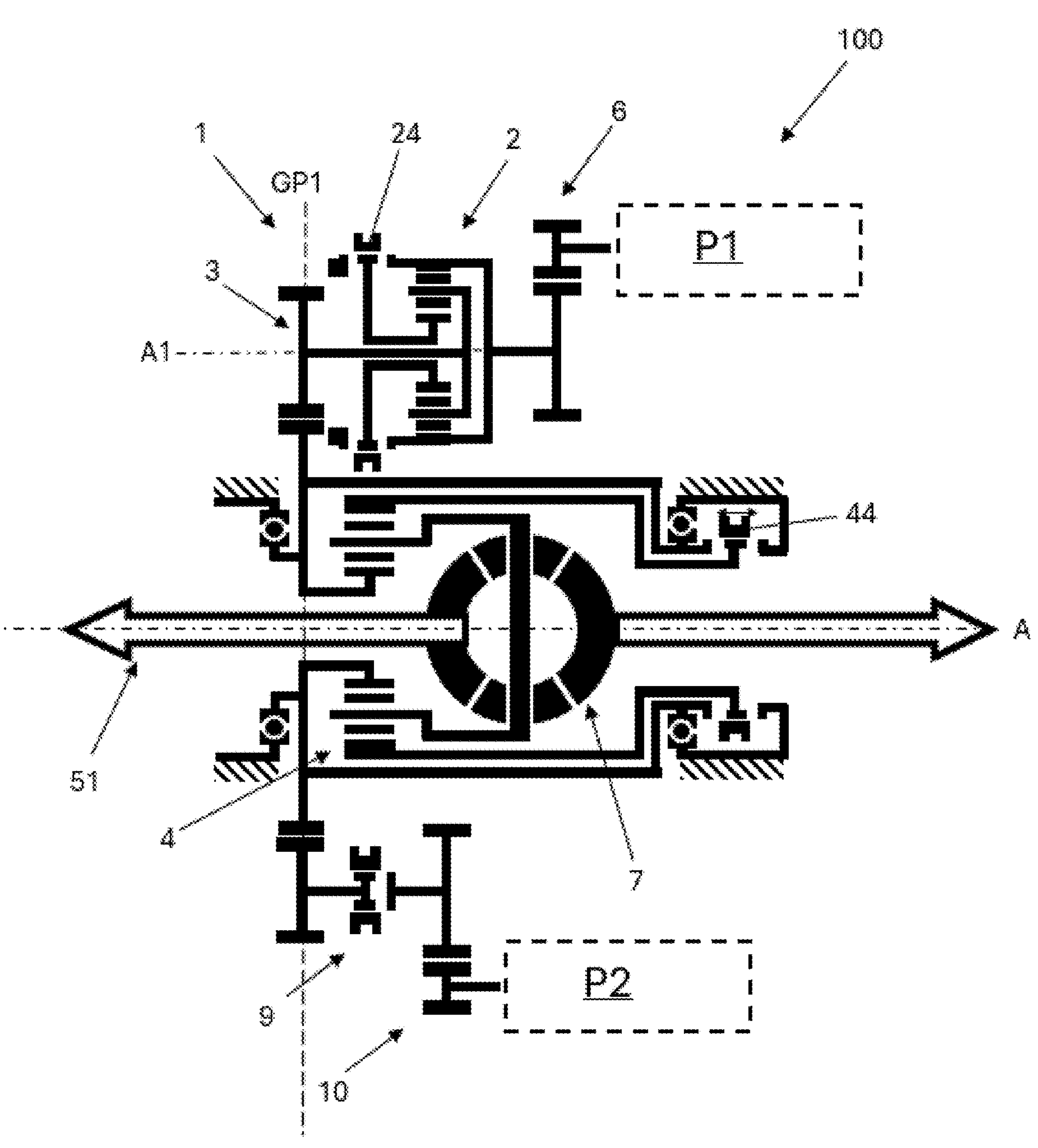
FIG. 7 is an exemplary transmission arrangement and/or powertrain in a schematic view according to an example.

FIG. 7 depicts an exemplary transmission arrangement 1 in a schematic view according to another example, which for example may form part of the vehicle 200 shown in FIG. 1.

In this example, the transmission arrangement 1 is configured as a combination of the transmission arrangements 1 shown in FIG. 3 and FIG. 6. Accordingly, in addition to the transmission arrangement configuration shown in FIG. 6, the transmission arrangement 1 in FIG. 7 further comprises the above-mentioned first additional reduction gearset 6. As indicated in FIG. 7, this may result in that smaller power units P1, P2 may be used, and/or higher-speed power units.

Respective gear planes of the first and second additional reduction gearsets 6, 10 may be arranged perpendicular to the common rotational axis A, similar to the gear plane GP1.

Figure 8:
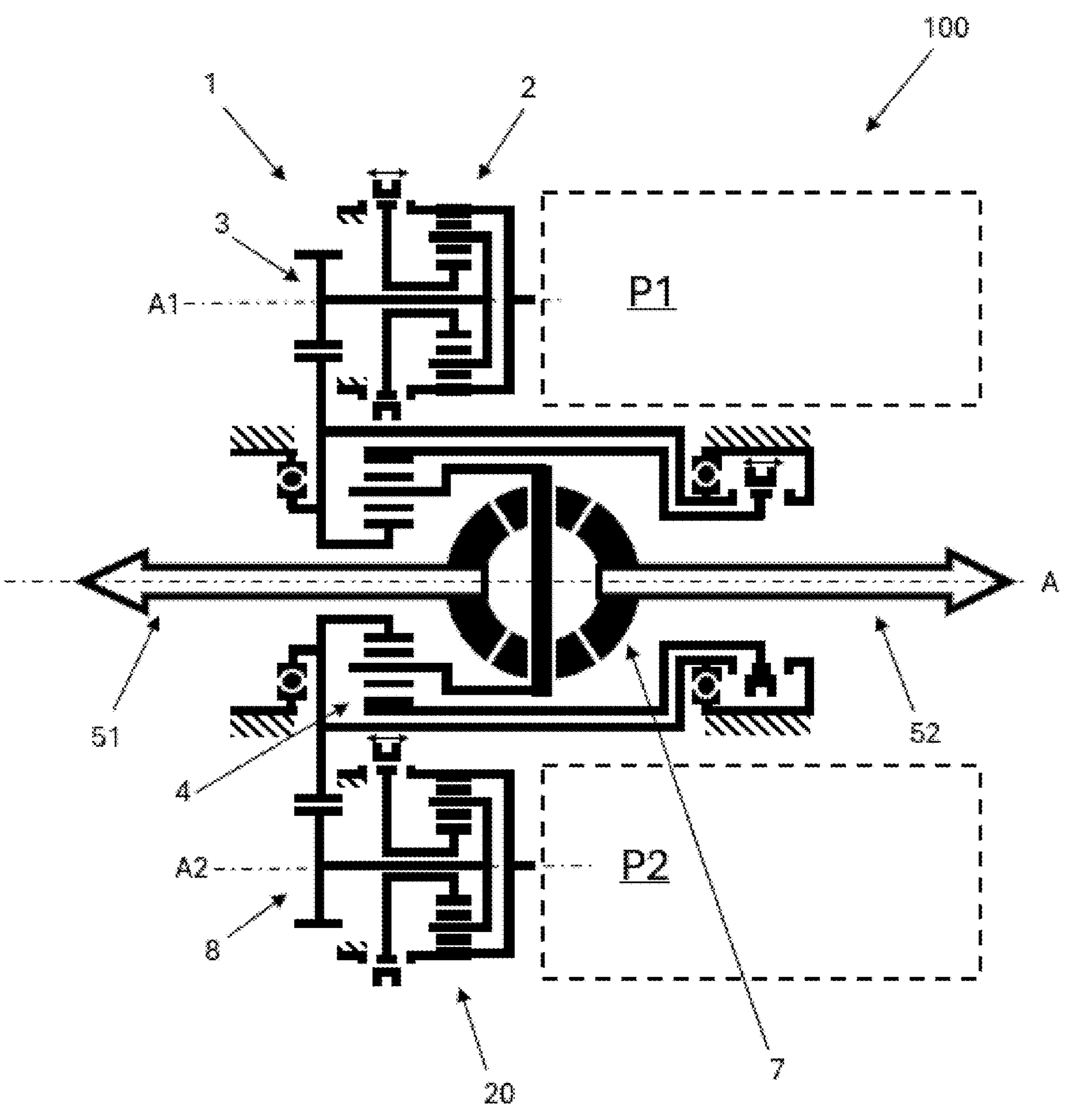
FIG. 8 is an exemplary transmission arrangement and/or powertrain in a schematic view according to an example.

FIG. 8 depicts an exemplary transmission arrangement 1 in a schematic view according to another example, which for example may form part of the vehicle 200 shown in FIG. 1.

In this example, the transmission arrangement 1 is similar to the transmission arrangement 1 shown in FIG. 2, with the difference that it further comprises a third planetary gearset 20, configured to be drivingly connected to the second power unit P2 upstream from the third planetary gearset 20, and shiftable between at least two gear states, comprising a direct gear state with a 1:1 speed ratio and a speed reduction gear state. For example, the third planetary gearset 20 may be configured according to any example of the first planetary gearset 2. By this configuration, the transmission arrangement 1 may be shiftable between more speed ratios or gear states, e.g., between at least eight (i.e., 2×2×2) different speed ratios, or sixteen speed ratios if also the neutral states are used for the first and third planetary gear sets 2, 20.

For example, by the configuration shown in FIG. 8, when shifting gear in one of the first planetary gearset 2 and the third planetary gearset 20, the vehicle 200 can be driven by the other one of the power units P1, P2 which is drivingly connected to the first planetary gearset 2 or the third planetary gearset 20. Thereby, smoother operation of the vehicle 200 may be achieved, mitigating unwanted power cuts during driving.

Similar to the above with respect to the first planetary gearset 2, the speed reduction of the third planetary gearset 20 when being in the speed reduction gear state may be smaller than the speed reduction of the second planetary gearset 4 when being in at least one speed reduction gear state of the at least one speed reduction gear state.

According to an example, the second additional reduction gearset 10 as shown in FIG. 6 or FIG. 7 may be provided upstream from the third planetary gearset 20 as shown in FIG. 8.

Further, similar to the first planetary gearset 2, the third planetary gearset 20 may be configured to be shiftable to a neutral state. Thereby, single motor operation may be enabled, resulting in efficient operation in e.g. low power operation states.

Still further, similar to the first planetary gearset 2, a rotational axis A2 of the third planetary gearset 20 may as shown be parallel to the common rotational axis A.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

In the following, possible features and feature combinations of the present disclosure are presented as a list of Examples.

Example 1: A transmission arrangement (1) for a vehicle (200), comprising:

- a first planetary gearset (2), configured to be drivingly connected to a first power unit (P1) upstream from the first planetary gearset (2), and shiftable between at least two gear states, comprising a direct gear state with a 1:1 speed ratio and a speed reduction gear state,
- a first secondary reduction gearset (3) drivingly connected to the first planetary gearset (2) and provided downstream the first planetary gearset (2),
- a second planetary gearset (4) drivingly connected to the first secondary reduction gearset (3) and provided downstream the first secondary reduction gearset (3), wherein the second planetary gearset (4) is shiftable between at least two gear states, comprising a direct gear state with a 1:1 speed ratio and at least one speed reduction gear state,
- at least one drive shaft (51, 52), preferably two half-shafts (51, 52), drivingly connected to the second planetary gearset (4) and provided downstream the second planetary gearset (4), wherein the at least one drive shaft (51, 52) and the second planetary gearset (4) are coaxially arranged and configured to rotate with respect to a common rotational axis (A).

Example 2: The transmission arrangement (1) according to Example 1, wherein the speed reduction of the first planetary gearset (2) when being in the speed reduction gear state is smaller than the speed reduction of the second planetary gearset (4) when being in at least one speed reduction gear state of the at least one speed reduction gear state.

Example 3: The transmission arrangement (1) according to any one of the preceding Examples, further comprising a first additional reduction gearset (6), drivingly connected to the first planetary gearset (2) and provided upstream the first planetary gearset (2), and wherein the first additional reduction gearset (6) is configured to be drivingly connected to the first power unit (P1) upstream from the first additional reduction gearset (6).

Example 4: The transmission arrangement (1) according to any one of the preceding Examples, wherein a rotational axis (A1) of the first planetary gearset (2) is parallel to the common rotational axis (A).

Example 5: The transmission arrangement (1) according to any one of the preceding Examples, further comprising a differential gearset (7) drivingly connected to the at least one drive shaft (51, 52) and to the second planetary gearset (4), and provided downstream the second planetary gearset (4) and upstream from the at least one drive shaft (51, 52), wherein the at least one drive shaft (51, 52), the second planetary gearset (4) and the differential gearset (7) are coaxially arranged and configured to rotate with respect to the common rotational axis (A).

Example 6: The transmission arrangement (1) according to any one of the preceding Examples, wherein at least one of the first planetary gearset (2) and the second planetary gearset (4) is configured to be shiftable to a neutral state.

Example 7: The transmission arrangement (1) according to any one of the preceding Examples, further comprising a second secondary reduction gearset (8) drivingly connected to the second planetary gearset (4) and provided upstream from the second planetary gearset (4), and configured to be drivingly connected to a second power unit (P2) upstream from the second secondary reduction gearset (8).

Example 8: The transmission arrangement (1) according to Example 7, further comprising a clutch arrangement (9) for selectively disconnecting a driving connection between the second power unit (P2) and the second secondary reduction gearset (8).

Example 9: The transmission arrangement (1) according to any one of Examples 7-8, further comprising a second additional reduction gearset (10), drivingly connected to the second secondary reduction gearset (8) and provided upstream the second secondary reduction gearset (8), and wherein the second additional reduction gearset (10) is configured to be drivingly connected to the second power unit (P2) upstream from the second additional reduction gearset (10).

Example 10: The transmission arrangement (1) according to any one of Examples 7-9, wherein the first secondary reduction gearset (3) and the second secondary reduction gearset (8) share a common gearwheel (32) and are provided in a common gear plane (GP1).

Example 11: The transmission arrangement (1) according to Example 10, wherein the first secondary reduction gearset (3) comprises a first gearwheel (31) drivingly connected to the common gearwheel (32) and wherein the second secondary reduction gearset (8) comprises a second gearwheel (81) drivingly connected to the common gearwheel (32), wherein a number of gear teeth of the first gearwheel (31) is different from a number of gear teeth of the second gearwheel (81).

Example 12: The transmission arrangement (1) according to any one of Examples 7-11, further comprising a third planetary gearset (20), configured to be drivingly connected to the second power unit (P2) upstream from the third planetary gearset (20), and shiftable between at least two gear states, comprising a direct gear state with a 1:1 speed ratio and a speed reduction gear state.

Example 13: The transmission arrangement (1) according to Example 12, wherein the speed reduction of the third planetary gearset (20) when being in the speed reduction gear state is smaller than the speed reduction of the second planetary gearset (4) when being in at least one speed reduction gear state of the at least one speed reduction gear state.

Example 14: The transmission arrangement (1) according to Example 12 or 13, when also being dependent on Example 9, wherein the second additional reduction gearset (10) is provided upstream from the third planetary gearset (20).

Example 15: The transmission arrangement (1) according to any one of Examples 12-14, wherein the third planetary gearset (20) is configured to be shiftable to a neutral state.

Example 16: The transmission arrangement (1) according to any one of Examples 12-15, wherein a rotational axis (A2) of the third planetary gearset (20) is parallel to the common rotational axis (A).

Example 17: The transmission arrangement (1) according to any one of Examples 7-11, wherein the transmission arrangement (1) is configured with a constant non-shiftable speed reduction from the second power unit (P2) to the second planetary gearset (4).

Example 18: A powertrain (100) for a vehicle, comprising a first power unit (P1) and a transmission arrangement (1) according to any one of the preceding claims, or comprising a first power unit (P1), a second power unit (P2) and a transmission arrangement according to any one of Examples 7-17.

Example 19: A vehicle (200) comprising a transmission arrangement according to any one of Examples 1-17 or a powertrain according to Example 18.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transmission arrangement for a vehicle, comprising:

a first planetary gearset, configured to be drivingly connected to a first power unit upstream from the first planetary gearset, and shiftable between at least two gear states, comprising a direct gear state with a 1:1 speed ratio and a speed reduction gear state;

a first secondary reduction gearset drivingly connected to the first planetary gearset and provided downstream the first planetary gearset;

a second planetary gearset drivingly connected to the first secondary reduction gearset and provided downstream the first secondary reduction gearset, wherein the second planetary gearset is shiftable between at least two gear states, comprising a direct gear state with a 1:1 speed ratio and at least one speed reduction gear state; and at least one drive shaft drivingly connected to the second planetary gearset and provided downstream the second planetary gearset, wherein the at least one drive shaft and the second planetary gearset are coaxially arranged and configured to rotate with respect to a common rotational axis.

2. The transmission arrangement of claim 1, wherein the speed reduction of the first planetary gearset when being in the speed reduction gear state is smaller than the speed reduction of the second planetary gearset when being in at least one speed reduction gear state of the at least one speed reduction gear state.

3. The transmission arrangement of claim 1, further comprising a first additional reduction gearset, drivingly connected to the first planetary gearset and provided upstream the first planetary gearset, and wherein the first additional reduction gearset is configured to be drivingly connected to the first power unit upstream from the first additional reduction gearset.

4. The transmission arrangement of claim 1, wherein a rotational axis of the first planetary gearset is parallel to the common rotational axis.

5. The transmission arrangement of claim 1, further comprising a differential gearset drivingly connected to the at least one drive shaft and to the second planetary gearset, and provided downstream the second planetary gearset and upstream from the at least one drive shaft, wherein the at least one drive shaft, the second planetary gearset and the differential gearset are coaxially arranged and configured to rotate with respect to the common rotational axis.

6. The transmission arrangement of claim 1, wherein at least one of the first planetary gearset and the second planetary gearset is configured to be shiftable to a neutral state.

7. The transmission arrangement of claim 1, further comprising a second secondary reduction gearset drivingly connected to the second planetary gearset and provided upstream from the second planetary gearset, and configured to be drivingly connected to a second power unit upstream from the second secondary reduction gearset.

8. The transmission arrangement of claim 7, further comprising a clutch arrangement for selectively disconnecting a driving connection between the second power unit and the second secondary reduction gearset.

9. The transmission arrangement of claim 7, further comprising a second additional reduction gearset, drivingly connected to the second secondary reduction gearset and provided upstream the second secondary reduction gearset, and wherein the second additional reduction gearset is configured to be drivingly connected to the second power unit upstream from the second additional reduction gearset.

10. The transmission arrangement of claim 7, wherein the first secondary reduction gearset and the second secondary reduction gearset share a common gearwheel and are provided in a common gear plane.

11. The transmission arrangement of claim 10, wherein the first secondary reduction gearset comprises a first gearwheel drivingly connected to the common gearwheel and wherein the second secondary reduction gearset comprises a second gearwheel drivingly connected to the common gearwheel, wherein a number of gear teeth of the first gearwheel is different from a number of gear teeth of the second gearwheel.

12. The transmission arrangement of claim 7, further comprising a third planetary gearset, configured to be drivingly connected to the second power unit upstream from the third planetary gearset, and shiftable between at least two gear states, comprising a direct gear state with a 1:1 speed ratio and a speed reduction gear state.

13. The transmission arrangement of claim 12, wherein the speed reduction of the third planetary gearset when being in the speed reduction gear state is smaller than the speed reduction of the second planetary gearset when being in at least one speed reduction gear state of the at least one speed reduction gear state.

14. The transmission arrangement of claim 12, further comprising a second additional reduction gearset, drivingly connected to the second secondary reduction gearset and provided upstream the second secondary reduction gearset, and wherein the second additional reduction gearset is configured to be drivingly connected to the second power unit upstream from the second additional reduction gearset;

wherein the second additional reduction gearset is provided upstream from the third planetary gearset.

15. The transmission arrangement of claim 12, wherein the third planetary gearset is configured to be shiftable to a neutral state.

16. The transmission arrangement of claim 12, wherein a rotational axis of the third planetary gearset is parallel to the common rotational axis.

17. The transmission arrangement of claim 7, wherein the transmission arrangement is configured with a constant non-shiftable speed reduction from the second power unit to the second planetary gearset.

18. A powertrain for a vehicle, comprising the first power unit, the second power unit, and the transmission arrangement of claim 7.

19. A powertrain for a vehicle, comprising the first power unit and the transmission arrangement of claim 1.

20. A vehicle comprising the powertrain of claim 19.

21. A vehicle comprising the transmission arrangement of claim 1.

* * * * *